US012623950B2

(12) United States Patent (10) Patent No.: US 12,623,950 B2
Bauco et al. (45) Date of Patent: May 12, 2026

(54) LIGHT-BASED OPTICAL FIBER HEATERS USING HOLLOW LIGHT PIPES

(71) Applicant: CORNING INCORPORATED,
Corning, NY (US)

(72) Inventors: Anthony Sebastian Bauco, Horseheads,
NY (US); Joel Patrick Carberry, Big
Flats, NY (US); Ming-Jun Li,
Horseheads, NY (US); **Craig Daniel
Nie, Corning, NY (US); Vincent
Matteo Tagliamonti**, Rochester, NY
(US); Chunfeng Zhou, Painted Post,
NY (US)

(73) Assignee: CORNING INCORPORATED,
Corning, NY (US)

( * ) Notice: Subject to any disclaimer, the term of this
patent is extended or adjusted under 35
U.S.C. 154(b) by 439 days.

(21) Appl. No.: 17/969,094

(22) Filed: Oct. 19, 2022

(65) Prior Publication Data

US 2023/0131288 A1 Apr. 27, 2023

Related U.S. Application Data

(60) Provisional application No. 63/270,250, filed on Oct.
21, 2021.

(51) Int. Cl.
*C03B 37/027* (2006.01)
*C03B 37/012* (2006.01)
*C03B 37/018* (2006.01)
(52) U.S. Cl.
CPC .. *C03B 37/02718* (2013.01); *C03B 37/01211*
(2013.01); *C03B 37/01876* (2013.01)
(58) Field of Classification Search
CPC ........ C03B 37/02718; C03B 37/28727; C03B
37/029; B23K 26/064; B23K 26/0643;
G02B 6/0096
See application file for complete search history.

(56) References Cited

U.S. PATENT DOCUMENTS 5,751,870 A 5/1998 Forkner et al.
2006/0285815 A1* 12/2006 Cianciotto ........... G02B 27/106
385/146

(Continued)

FOREIGN PATENT DOCUMENTS

CN 103018858 A 4/2013
DE 4130952 A1 * 4/1993 ........... B23K 26/032
WO WO-2014031641 A2 * 2/2014 ........... F21S 10/007

OTHER PUBLICATIONS

Edmunds Optics, "Fundamentals of Lasers", https://www.edmundoptics.
com/knowledge-center/application-notes/lasers/fundamentals-of-
lasers/#:~:text=The%20beam%20diameter%20can%20be,times%
20the%20maximum%20intensity%20value, Wayback Machine capture
Dec. 26, 2019, 2 pages. (Year: 2019).*

(Continued)

*Primary Examiner* — Lisa L Herring
(74) *Attorney, Agent, or Firm* — Kevin L. Bray

(57) ABSTRACT

A method of processing an optical fiber that includes draw-
ing an optical fiber along a fiber pathway through a hollow
light pipe, wherein the hollow light pipe comprises a first
end having an opening with a radius $R_p$, a second end and
a pipe body comprising a chamber extending from the first
to the second end, the fiber pathway extending through the
pipe body, and a reflective coating is disposed on the pipe
body, and directing a light from a directed light source into
the hollow light pipe through the opening such that the light
is reflected by the reflective coating while propagating in the
hollow light pipe, the optical fiber absorbing the light
reflected by the reflective coating, wherein the light enters
the opening of the hollow light pipe at an input angle in a
range of from 10° to 70° with respect to the fiber pathway.

18 Claims, 11 Drawing Sheets

(56) References Cited

U.S. PATENT DOCUMENTS

| | | | |
|---|---|---|---|
| 2009/0188901 A1* | 7/2009 | Dantus ................. | B23K 26/067 |
| | | | 219/121.76 |
| 2011/0037956 A1 | 2/2011 | Lin et al. | |
| 2014/0294356 A1* | 10/2014 | Wang ..................... | G02B 6/443 |
| | | | 385/134 |
| 2015/0301269 A1* | 10/2015 | Nishitani ............. | G02B 6/0068 |
| | | | 362/609 |
| 2017/0073265 A1* | 3/2017 | Bookbinder ...... | C03B 37/02727 |
| 2017/0211776 A1* | 7/2017 | Matsuyama ......... | G02B 6/0096 |
| 2017/0240456 A1 | 8/2017 | Akarapu et al. | |
| 2019/0359517 A1 | 11/2019 | Argaw et al. | |
| 2022/0098085 A1 | 3/2022 | Akarapu et al. | |

OTHER PUBLICATIONS

DE-4130952-A1 EPO Machine Translation Retrieved Jan. 31, 2025. (Year: 2025).*
Liu, Anping, et al., "The absorption characteristics of circular, offset, and rectangular double-clad fibers", in Optics Communications, vol. 132, 1966, pp. 511-518.

\* cited by examiner

LIGHT-BASED OPTICAL FIBER HEATERS USING HOLLOW LIGHT PIPES

This application claims the benefit of priority under 35 U.S.C. § 120 of U.S. Provisional Application Ser. No. 63/270,250 filed on Oct. 21, 2021, the content of which is relied upon and incorporated herein by reference in its entirety.

BACKGROUND

Field

The present specification generally relates to systems and methods of controlled heating of optical fibers.

Technical Background

Currently, optical fiber draw speeds to produce extremely low-loss fiber are limited due to increased attenuation penalties and the constraints of temperature in the heating and cooling processes. Slow cooling devices are used to improve the glass structural relaxation and reduce the fictive temperature. By reducing the fictive temperature, the dominant form of fiber attenuation, Rayleigh scattering, is reduced through slow cooling. Longer time in a slow cooling device can lower the fictive temperature further and therefore lower the fiber attenuation. However, as draw speeds increase, the fiber spends less time in the slow cooling device. The penalty is that the fictive temperature is not reduced as strongly and the fiber attenuation is increased.

Accordingly, a need exists for an improved systems and methods for controlled heating of optical fibers during a draw process.

SUMMARY

According to a first aspect of the present disclosure, a method of processing an optical fiber includes drawing an optical fiber along a fiber pathway through a hollow light pipe, wherein the hollow light pipe comprises a first end having an opening with a radius $R_p$, a second end and a pipe body comprising a chamber extending from the first end to the second end, the fiber pathway extending through the pipe body, and a reflective coating is disposed on the pipe body. The method also includes directing a light from a directed light source into the hollow light pipe through the opening of the first end such that the light is reflected by the reflective coating while propagating in the hollow light pipe, the optical fiber absorbing the light reflected by the reflective coating, wherein the light enters the opening of the first end of the hollow light pipe at an input angle in a range of from 10° to 70° with respect to the fiber pathway.

A second aspect of the present disclosure includes the method of the first aspect, wherein the light comprises a $1/e^2$ diameter that is less than or equal to the radius $R_p$.

A third aspect of the present disclosure includes the method of the first aspect or the second aspect, wherein the fiber pathway is laterally offset from a central axis of the pipe body by a distance in a range of from 20% to 80% of the radius $R_p$.

A fourth aspect of the present disclosure includes the method of any of the first through third aspects, wherein the directed light source is optically coupled to a steering mirror positioned to direct the light into the opening of the first end of the hollow light pipe at the input angle.

A fifth aspect of the present disclosure includes the method of any of the first through fourth aspects, wherein the hollow light pipe comprises a length of in a range of from 100 mm to 10 meters.

A sixth aspect of the present disclosure includes the method of any of the first through fifth aspects, wherein the input angle is in a range of from 30° to 70° with respect to the fiber pathway.

A seventh aspect of the present disclosure includes the method of any of the first through sixth aspects, wherein the reflective coating is disposed on an inner surface of the pipe body.

An eighth aspect of the present disclosure includes the method of any of the first through sixth aspects, wherein the reflective coating is disposed on an outside surface of the pipe body.

An ninth aspect of the present disclosure includes the method of any of the first through eighth aspects, wherein the reflective coating has a reflectivity of 95% or greater of the light.

A tenth aspect of the present disclosure includes the method of any of the first through ninth aspects, wherein the reflective coating comprises one or more of Au, Ag, and AgI.

An eleventh aspect of the present disclosure includes the method of any of the first through tenth aspects, wherein the directed light source comprises a CO laser or a $CO_2$ laser.

A twelfth aspect of the present disclosure includes the method of any of the first through eleventh aspects, wherein a number of reflections of the light by the reflective coating is two or more while the light propagates in the hollow light pipe, the optical fiber absorbing the light after each of the reflections.

A thirteenth aspect of the present disclosure includes the method of any of the first through twelfth aspects, wherein a temperature of a core of the optical fiber at the opening of the first end is less than a glass transition temperature of the core of the optical fiber.

A fourteenth aspect of the present disclosure includes the method of the thirteenth aspect, wherein when the optical fiber absorbs the light, the temperature of the core of the optical fiber increases to greater than the glass transition temperature.

According to a fifteenth aspect of the present disclosure, a system for processing an optical fiber includes an optical draw tower comprising a fiber pathway, wherein the optical draw tower is configured to draw an optical fiber along the fiber pathway, a first hollow light pipe and a second hollow light pipe positioned along the optical draw tower, each hollow light pipe comprising a first end having an opening with a radius $R_p$, a second end, and a pipe body comprising a chamber extending from the first end to the second end, wherein a reflective coating is disposed on the pipe body of each hollow light pipe and the fiber pathway extends through each hollow light pipe from the first end to the second end, a first directed light source optically coupled to the first end of the first hollow light pipe, and a second directed light source optically coupled to the first end of the second hollow light pipe.

A sixteenth aspect of the present disclosure includes the system of the fifteenth aspect, further comprising a first optical system configured to direct light output by the first directed light source into the first hollow light pipe through the opening of the first end at an input angle in a range of from 10° to 70° with respect to the fiber pathway and a second optical system configured to direct light output by the second directed light source into the second hollow light pipe through the opening of the first end at an input angle in a range of from 10° to 70° with respect to the fiber pathway.

A seventeenth aspect of the present disclosure includes the system of the sixteenth aspect, wherein the first optical system and the second optical system each comprise a first steering mirror and a second steering mirror.

An eighteenth aspect of the present disclosure includes the system of any of the fifteenth through seventeenth aspects, wherein the first directed light source comprises a CO laser or a $CO_2$ laser and the second directed light source comprises a CO laser or a $CO_2$ laser.

A nineteenth aspect of the present disclosure includes the system of any of the fifteenth through eighteenth aspects, further comprising one or more end mirrors each comprising a fiber opening, wherein each of the one or more end mirrors is positioned in the first end or the second end of the first hollow light pipe or the second hollow light pipe, wherein the fiber pathway extends through the fiber opening of each end mirror.

A twentieth aspect of the present disclosure includes the system of any of the fifteenth through nineteenth aspects, wherein the fiber pathway is laterally offset from a central axis of the pipe body of each of the first hollow light pipe and the second hollow light pipe by a distance in a range of from 20% to 80% the radius $R_p$ of the opening of the first end of each of the first hollow light pipe and the second hollow light pipe.

A twenty-first aspect of the present disclosure includes the system of any of the fifteenth through twentieth aspects, wherein the reflective coating disposed on the pipe body of each hollow light pipe has a reflectivity of 95% or greater of the light.

According to a twenty-second aspect of the present disclosure, a method of processing an optical fiber includes drawing an optical fiber along a fiber pathway through a hollow light pipe, wherein the hollow light pipe comprises a first end having an opening with a radius $R_p$, a second end and a pipe body comprising a chamber extending from the first end to the second end, the fiber pathway extending through the opening of the first end, wherein the fiber pathway is laterally offset from a central axis of the pipe body by a distance in a range of from 20% to 80% a radius $R_p$ of the opening of the first end and a reflective coating is disposed on the pipe body, the reflective coating comprising a reflectivity of 95% or greater of a light. The method also includes directing the light from a directed light source into the hollow light pipe through the opening of the first end such the light is reflected by the reflective coating while propagating in the hollow light pipe, the optical fiber absorbing the light reflected by the reflective coating, wherein the light enters the opening of the first end of the hollow light pipe at an input angle in a range of from 10° to 70° with respect to the fiber pathway with a $1/e^2$ diameter that is less than or equal to the radius $R_p$ of the opening of the first end.

A twenty-third aspect of the present disclosure includes the method of any of the twenty-second, wherein the hollow light pipe comprises a length of 200 mm or greater.

Additional features and advantages of the processes and systems described herein will be set forth in the detailed description which follows and, in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an over-view or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
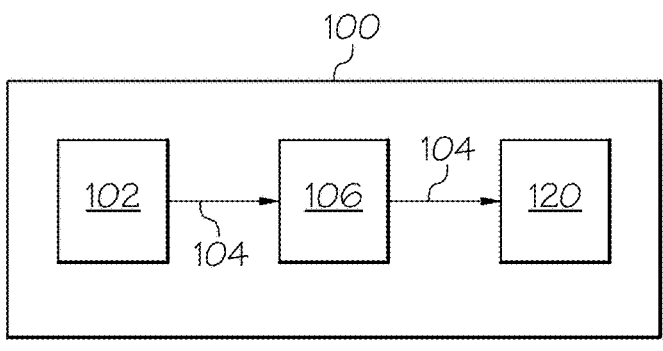
FIG. 1A is a block diagram illustrating a light-based optical fiber heater, according to one or more embodiments described herein.

Reference will now be made in detail to embodiments of methods and systems of heating an optical fiber using a laser system or other light source during a manufacturing process.

"Optical fiber" refers to a glass fiber configured to function as a waveguide at one or more wavelengths. The glass fiber includes a core and a cladding. Both the core and the cladding are glass. The cladding surrounds and is directly adjacent to the core. The cladding includes a single region or a plurality of concentric regions that differ in refractive index. The core and cladding differ in composition. The average refractive index of the core is greater than the average refractive index of the cladding. For purposes of the present disclosure, an optical fiber lacks a non-glass coating, such as the polymeric protective coatings known in the art. The outer surface of optical fibers disclosed herein correspond to the outer surface of the glass cladding.

The methods and systems described herein control heat applied to an optical fiber when cooling or reheating the optical fiber during a stationary process or a draw process, for example, after the optical fiber exits a furnace. This heat control facilitates the formation of low-loss optical fiber with a uniform diameter. Applying heat to an optical fiber to control its cooling rate during a slow cooling process lowers the attenuation of the optical fiber. Moreover, by strategically applying heat during the slow cooling process, the fictive temperature may be reduced. Control of the cooling rate is especially effective at reducing the fictive temperature when the temperature of the optical fiber is within a critical range; for example, a glass transition temperature range or temperature range slightly above the glass transition temperature of the core of the optical fiber (e.g. for silica-based optical fibers, a temperature range above about 800° C., or above about 900° C., or above about 1000° C., or in a range from about 800° C. to about 1300° C., or in a range from about 850° C. to about 1250° C., or in a range from about 900° C. to about 1200° C.). When the optical fiber cools to a temperature below the critical temperature range, further reductions in attenuation and/or fictive temperature can be achieved by reheating the optical fiber to within the critical temperature range so that the overall time at which the optical fiber cools within the critical temperature range is extended.

The embodiments described herein use a hollow light pipe to reflect light onto an optical fiber that is travelling through the hollow light pipe, for example, during a draw process to control the cooling rate (e.g. reduce the cooling rate) and/or reheat the optical fiber (e.g. from a temperature below the critical range to a temperature within the critical range). Using the methods and systems described herein, a uniform temperature profile of the glass of the optical fiber maybe achieved without introducing additional stresses, which stresses may compromise the quality of the glass of the optical fiber. Embodiments of methods and systems of applying heat to an optical fiber will now be described and, whenever possible, the same reference numerals will be used throughout the drawings to refer to the same or like parts.

FIG. 1A illustrates a light-based optical fiber heat application system 100 for applying heat to an optical fiber, which includes a directed light source 102 and an optical system 106, which may be used to apply heat to an optical fiber, such as optical fiber 108 depicted in FIG. 1B, to reduce its cooling rate or reheat it after it has cooled below a specified threshold temperature (e.g. a temperature below the critical range). As used herein, "light" refers to any wavelength that has practical emission for the disclosed applications and for which absorption in the glass of the optical fiber 108 is non-negligible. The directed light source 102 outputs light 104. The directed light source 102 may comprise a beam source and the light 104 may comprise a laser beam. The directed light source 102 can include, for example, a light emitting diode (LED), $CO_2$ laser, CO laser, quantum cascade (QC) laser, pulsed laser, continuous wave laser, pulsed laser, or ultraviolet light source. A "directed light source," as used herein, has sufficiently limited divergence that the light can be aimed at optics that steer, shape, focus, or otherwise process the light, or can be aimed into a hollow light pipe 120 (FIG. 2A). In some embodiments, for example, the directed light source 102 includes a multi-kilowatt $CO_2$ laser. Furthermore, the directed light source 102 can include other high-brightness light sources operating in ranges of wavelengths that can be absorbed by the optical fiber 108. In some embodiments, the light 104 has a wavelength in the range of 3.5 microns (μm) to 11 μm. However, the light 104 can also be provided over a wider wavelength range between, for example, 2 μm and 16 μm. Furthermore, silica optical fiber absorbs in the ultraviolet wavelength range, and in some embodiments, the directed light source 102 comprises an ultraviolet light source. As used herein, a "light pipe" is a structure which reflects and guides light to produce a homogeneous energy density of light.

In some embodiments, a wavelength of the light 104 output by the directed light source 102 is such that the absorption depth of the light 104 is of the same order as or larger than the radius of the optical fiber 108, which facilitates heating of the optical fiber 108 to a uniform internal temperature. As one example, light 104 output by a directed light source 102 comprising a $CO_2$ laser comprises a wavelength in a range of from 9.3 μm to 10.6 μm, which is absorbed by glass at an absorption depth of 400 nm at a wavelength of 9.3 μm and an absorption depth of 10 μm at a wavelength of 10.6 μm. As used herein, "absorption depth" is the penetration depth of light, which is defined as the distance at which the intensity of the light has decreased to 1/e of its incident value. In general the absorption depth decreases as the temperature is increased beyond 300 K. Thus, when a $CO_2$ laser is used as the directed light source 102, the fiber core 112 may be insufficiently heated, resulting in asymmetric heating and stress. However, it should be understood that, in some embodiments, a $CO_2$ laser is a sufficient directed light source 102 because even though heat energy applied by a $CO_2$ laser may be disproportionately concentrated near the outer surface of the optical fiber, the heat energy conducts toward the center of the optical fiber to provide a more uniform temperature distribution within the optical fiber. To reduce the absorption near the outer surface of the optical fiber 108 and more evenly apply heat to the fiber core 112, a CO laser may be used as the directed light source 102. The CO laser outputs a light 104 having a wavelength of about 5.5 μm having an absorption depth of about 70 μm, providing improved heating of the fiber core 112.

The optical system 106 directs the light 104 from the directed light source 102 into the hollow light pipe 120 and onto an optical fiber 108 traveling through the hollow light pipe 120. "Directing light," as used herein, includes processing the light 104 by steering, shaping, scanning, focusing, defocusing, or otherwise manipulating light 104 from the directed light source 102 to cause the light 104 to enter the hollow light pipe 120. The optical system 106 illustrated in FIG. 1A can include a mirror, a beam splitter, a scanning mirror, a flat mirror, curved mirror, parabolic mirror, beam shaping element (e.g., lens), or any combination thereof.

Furthermore, in some embodiments illustrated hereinafter, the optical system 106 includes multiple lenses, mirrors, or other light directing or beam-shaping elements.

Figure 1B:
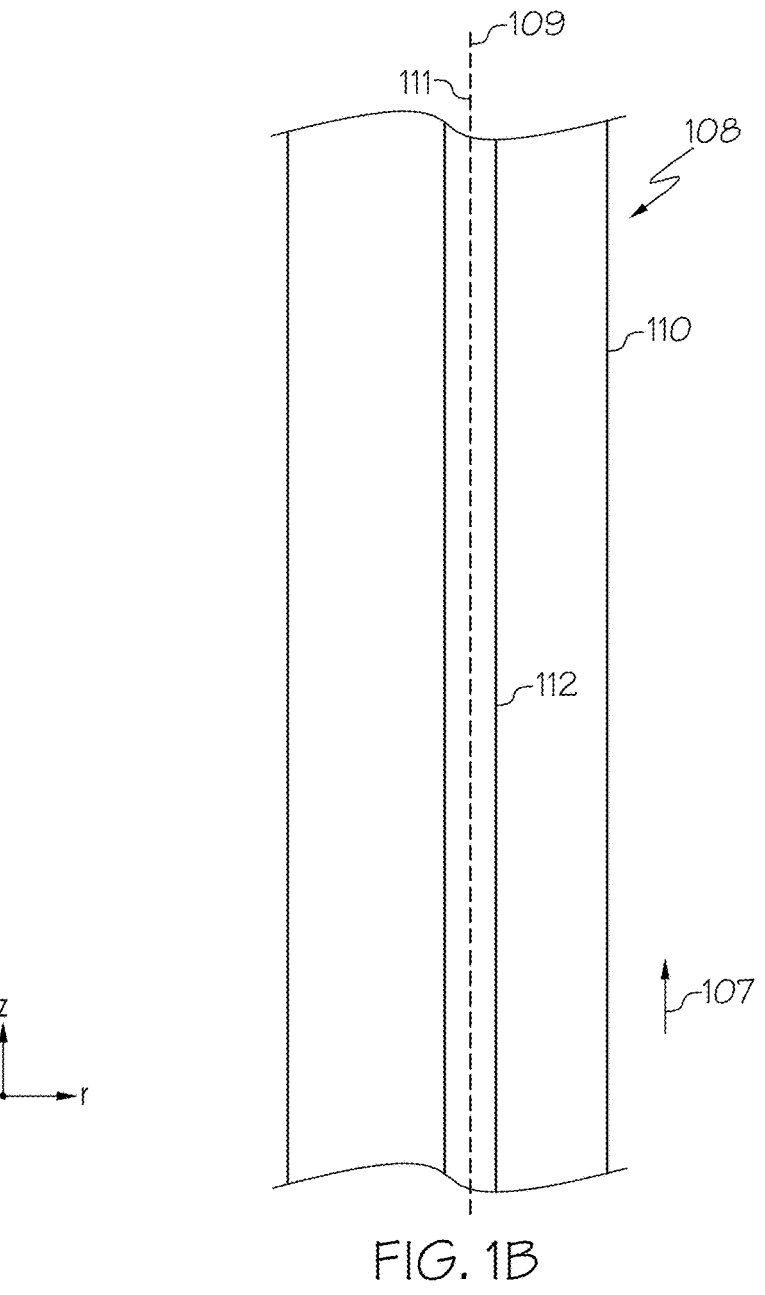
FIG. 1B schematically depicts an optical fiber, according to one or more embodiments described herein.

As shown in FIG. 1B, the optical fiber 108 includes a fiber cladding 110 and a fiber core 112 and is drawn in a draw direction 107 indicated in FIG. 1B along an axis 109 of the optical fiber 108. The light-based optical fiber heat application system 100 is configured to apply heat to the fiber core 112 of the optical fiber 108 to increase a fiber core temperature to within a glass transformation temperature range of the fiber core 112, as further described hereinafter with respect to FIG. 1C, and/or to extend the period of time during which the fiber core temperature remains within the glass transformation temperature range of the fiber core 112. By rapidly heating the temperature of the fiber core 112 to the glass transformation temperature range, followed by subsequent control of the temperature of the fiber core 112 over time as it cools to a temperature below the glass transformation temperature range, the fictive temperature of the fiber core 112 can be reduced, as well as the concentration of non-bridging oxygen defects in the fiber core 112, relative to cooling using only room temperature air. As a consequence, Rayleigh scattering from the fiber core 112 may also be reduced. When the temperature of the fiber core 112 is within the glass transformation temperature range, application of heat from the light-based optical fiber heating system 100 to the optical fiber 108 provides analogous benefits by controlling (reducing) the rate of cooling of the optical fiber 108 to extend the time period over which the temperature of the optical fiber 108 is within the glass transformation temperature range.

In the process of applying heat to the fiber core 112, heat is also applied to the fiber cladding 110. Under some conditions, temperature of the fiber cladding 110 may be substantially equal to temperature of the fiber core 112. In other cases, particularly during periods of heating rapidly using the light-based optical fiber heat 100, or during periods of rapid cooling, temperatures of the fiber core 112 and fiber cladding 110 may differ by as much as 300° C. or more. For situations in which the surface of the fiber cladding 110 is momentarily at a higher temperature than the surface of the fiber core 112, it is desirable that the surface of the fiber cladding 110 not be momentarily heated to above the melting point of the material (e.g., glass) of the fiber cladding 110 or the fiber core 112.

Figure 1C:
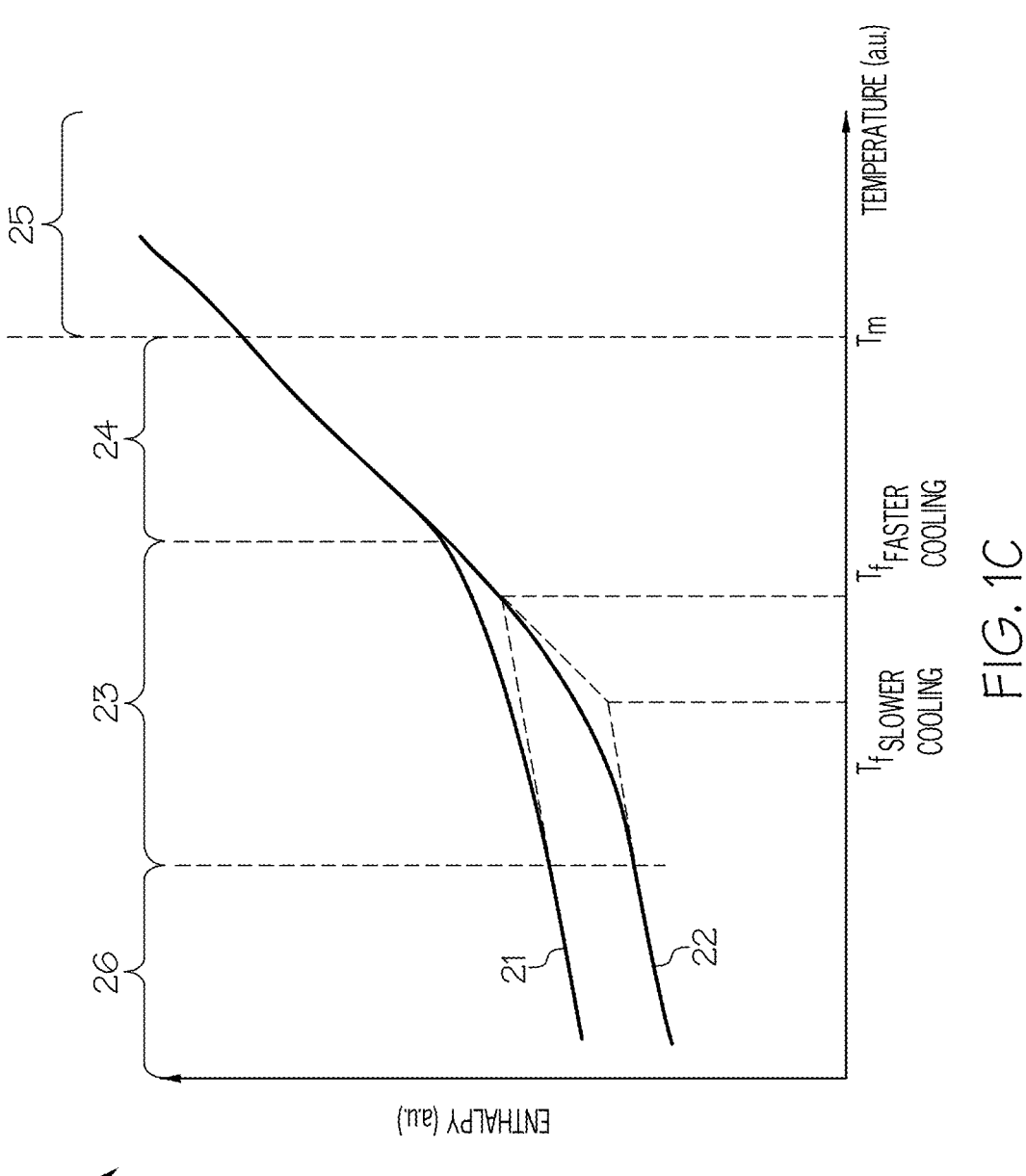
FIG. 1C graphically depicts enthalpy of a glass optical fiber core as a function of temperature, according to one or more embodiments described herein.
Figure 2A:
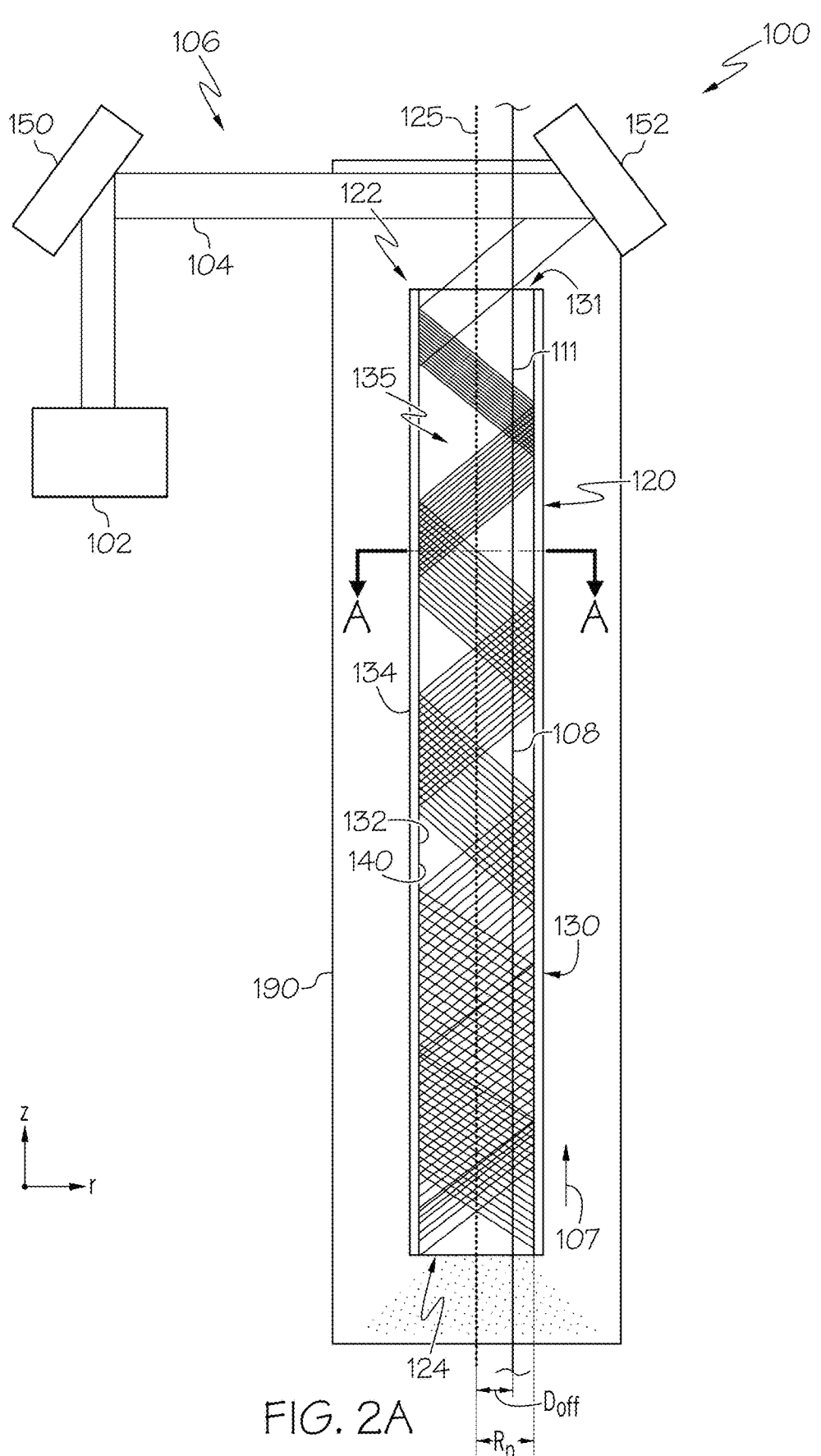
FIG. 2A schematically depicts a light-based optical fiber heater comprising a directed light source and a hollow light pipe, according to one or more embodiments described herein.

Referring now to FIG. 1C, graph 20 illustrates enthalpy of glass, in arbitrary units (a. u.), as a function of temperature (a.u.), illustrating what happens as fiber core 112 of a glass optical fiber cools. Further, since glass volume behaves in a manner similar to enthalpy, the graph can further be understood to represent glass volume as a function of temperature. FIG. 1C illustrates a glass transformation temperature range 23 over which properties of the fiber core 112 vary between those of a supercooled liquid and those of a solid. As the fiber core 112 is cooled below the liquid temperature range 25, once the temperature drops below a crystal melting temperature $T_M$, the fiber core 112 enters a supercooled liquid temperature range 24.

Once in the glass transformation temperature range 23, cooling rate of the glass affects the enthalpy and volume of the solid glass that is eventually formed as the glass cools to a solid temperature range 26. For example, as illustrated in FIG. 1C, when the fiber core 112 is cooled relatively faster along a temperature profile curve 21, it has higher enthalpy and volume and is characterized by a relatively higher fictive temperature $T_{f, fast\ cooling}$. On the other hand, when the fiber core 112 is cooled relatively slower along the temperature profile curve 22, for example, it has relatively lower enthalpy and volume and is characterized by a lower fictive temperature $T_{f, slow\ cooling}$. Fictive temperature can also be referred to as a transition temperature and is defined by the intersection between straight lines representing the cooling curves for the glassy (solid) state and for the supercooled liquid state. The reduction of fictive temperature of the fiber core 112, as illustrated in FIG. 1C, is only one of the beneficial effects of controlling cooling within the glass transformation range 23 of the fiber core 112. Non-bridging oxygen (NBO) defects can also be reduced by controlling the rate of cooling within the glass transformation range 23, and attenuation of light in the fiber core 112 when carrying optical signals can also be reduced in this manner.

Figure 2B:
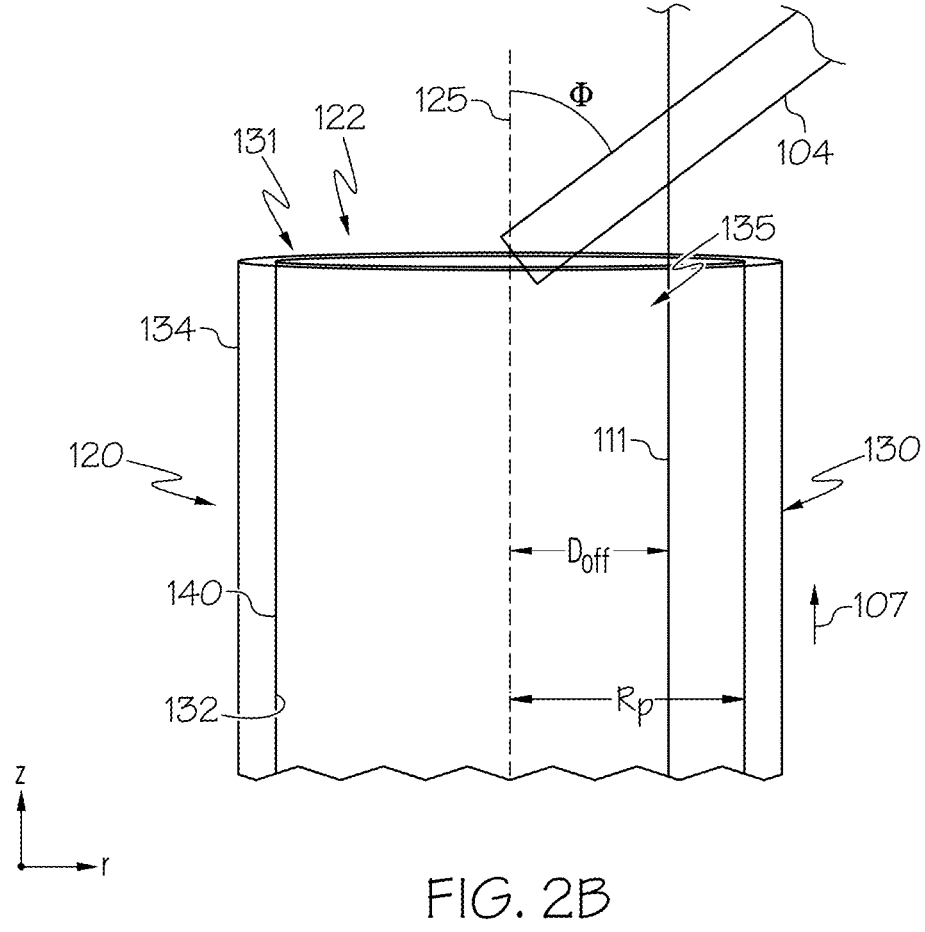
FIG. 2B schematically depicts a first end of the hollow light pipe of FIG. 2A, accordingly to one or more embodiments described herein.

Referring now to FIGS. 2A and 2B, the light-based optical fiber heat application system 100 is schematically depicted in more detail. In FIG. 2A, the hollow light pipe 120 is positioned along a fiber pathway 111 such that the fiber pathway 111 extends through the hollow light pipe 120 from a second end 124 of the hollow light pipe 120 to a first end 122 of the hollow light pipe 120. The first end 122 comprises an opening 131. The fiber pathway 111 is a pathway along which the optical fiber 108 travels during a draw process, a roll-to-roll process, or other optical fiber manufacture or modification process. In operation, the optical fiber 108 may be drawn along the fiber pathway 111 through the hollow light pipe 120 in the draw direction 107. In FIGS. 2A and 2B, the draw direction 107 is from the second end 124 to the first end 122. However, embodiments are contemplated in which the draw direction 107 extends from the first end 122 to the second end 124. While drawing the optical fiber 108 along the fiber pathway 111, the optical fiber 108 may vibrate, altering the radial position of the optical fiber 108 within the hollow light pipe 120, temporarily spacing the optical fiber 108 radially apart from the fiber pathway 111. Thus, it should be understood that the fiber pathway 111 refers to the intended pathway of the optical fiber 108 through the hollow light pipe 120.

As shown in FIG. 2A, the hollow light pipe 120 comprises a pipe body 130 with a chamber 135 extending from the first end 122 to the second end 124. The fiber pathway 111 extends through the pipe body 130 and the pipe body 130 includes an inner surface 132 opposite an outer surface 134. The hollow light pipe 120 comprises a length in a range of from 50 millimeters (mm) to 10 meters (m), such as a range of from 100 mm to 5 m, 100 mm to 1 m, 200 mm to 5 m, 200 mm to 1 m, 200 mm to 500 mm, for example, 50 mm, 100 mm, 150 mm, 200 mm, 250 mm, 300 mm, 350 mm, 400 mm, 500 mm, 600 mm, 700 mm, 750 mm, 1 m, 2 m, 3 m, 4 m, 5 m, 6 m, 7 m, 8 m, 9 m, 10 m, or any range having any two of these values as endpoints. The hollow light pipe 120 (i.e., the chamber 135 of a pipe body 130 of the hollow light pipe 120) comprises a diameter in a range of from 4 mm to 50 mm, such as a range of from 5 mm to 20 mm, for example, 4 mm, 5 mm, 8 mm, 10 mm, 12 mm, 15 mm, 20 mm, 25 mm, 30 mm, 35 mm, 40 mm, 45 mm, 50 mm, or any range having any two of these values as endpoints. It should be understood that the chamber 135 may have a variable diameter along the length of the chamber 135 (i.e., variable between the first end 122 and the second end 124) In some embodiments, the hollow light pipe 120 may be formed from a single seamless cylindrical tube or multiple pieces (e.g., two halves consisting of shorter cylindrical tubes or semi-circular arcs) that may be installed or removed from the fiber pathway 111 (e.g., from the optical draw tower) as needed. Moreover, in some embodiments, a protective insert (not illustrated), such as a rubber or silicon insert) may be placed inside the chamber 135 when the optical fiber 108 is first threaded into the hollow light pipe 120, before the draw process. The protective insert may then be removed before directing light 104 into the pipe body 130.

In FIG. 2A, the optical system 106 comprises a first steering mirror 150 and a second steering mirror 152, each optically coupled to the directed light source 102. For example, the light 104 output by the directed light source 102 reflects off of the first steering mirror 150, which directs the light 104 to the second steering mirror 152. The light 104 reflects off of the second steering mirror 152, which directs the light 104 into the first end 122 of the hollow light pipe 120. While not depicted, the optical system 106 may comprise additional optical components, such as one or more lenses to focus, collimate, or otherwise alter the light 104. In some embodiments, the hollow light pipe 120 is enclosed in a housing 190 which may absorb or otherwise block scattered or stray light that exits the hollow light pipe 120.

Figure 3B:
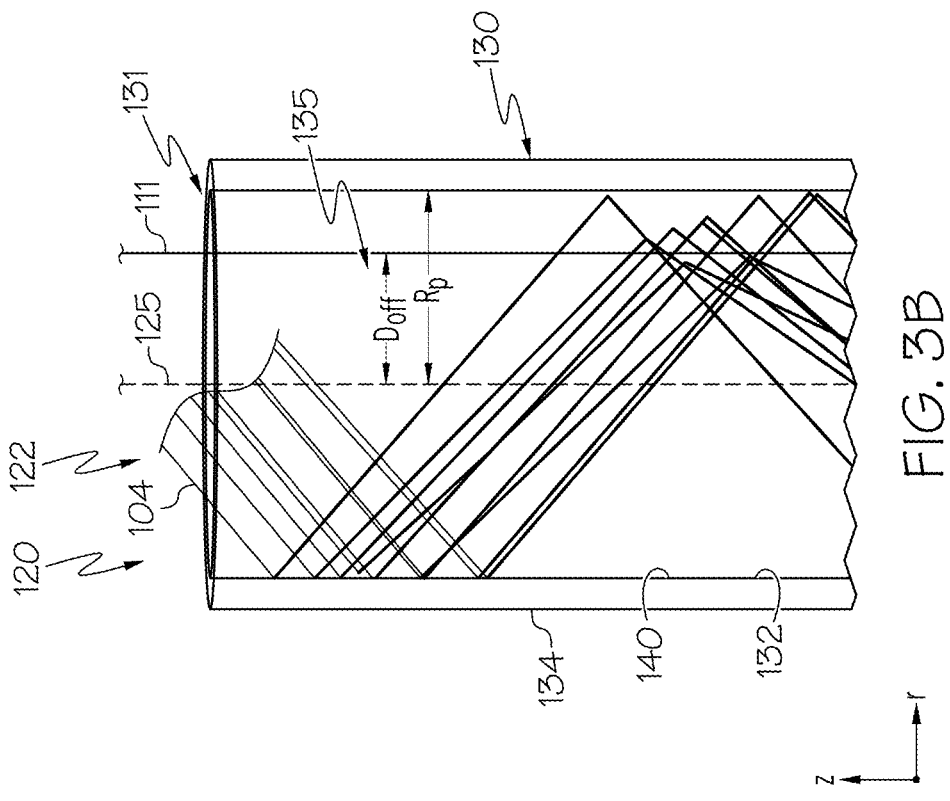
FIG. 3B schematically depicts a hollow light pipe having a reflective coating disposed on an inner surface of the hollow light pipe, according to one or more embodiments described herein.
Figure 3A:
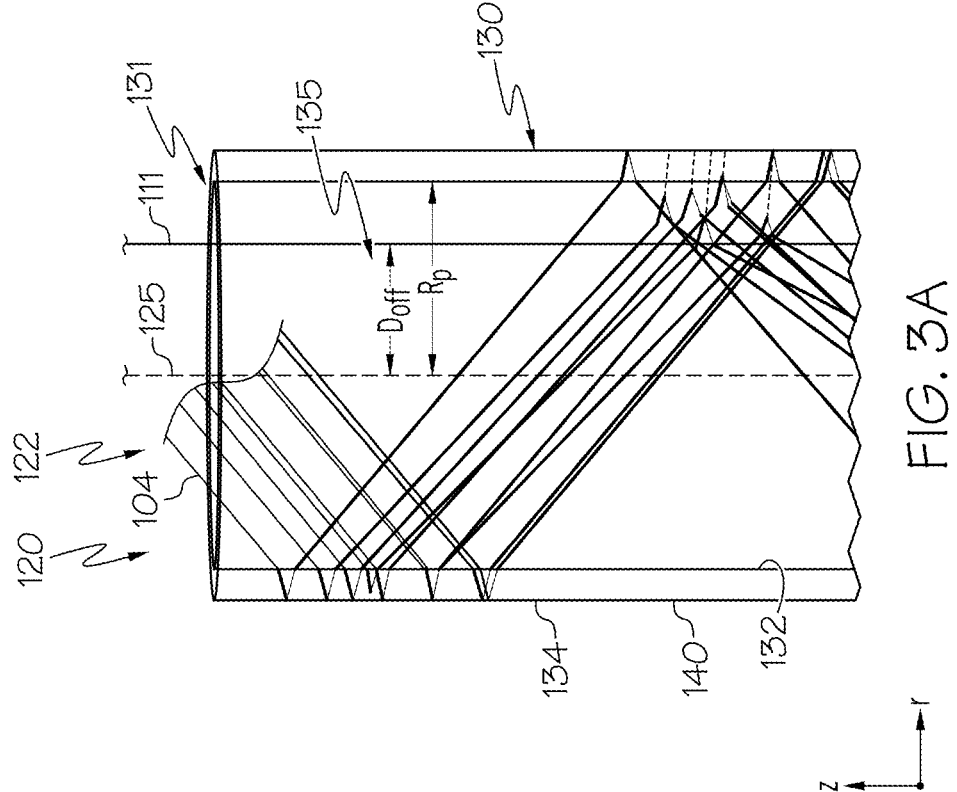
FIG. 3A schematically depicts a hollow light pipe having a reflective coating disposed on an outer surface of the hollow light pipe, according to one or more embodiments described herein.

Referring also to FIGS. 3A and 3B, a reflective coating 140 is disposed on the pipe body 130, for example, on the outer surface 134 of the pipe body 130 (FIG. 3A), the inner surface 132 of the pipe body 130 (FIG. 3B), or both. The reflective coating 140 comprises reflective material, such as one or more of Au, Ag, and AgI, Al, Cu, Rh, and $SiO_2$. The reflective coating 140 may also comprise a metal halide material. The reflective coating 140 comprises a reflectivity at the wavelength of the light 104 of 90% or greater, such as 95% or greater, 98% or greater, or the like, for example, 90%, 91%, 92%, 93%, 94%, 95%, 96%, 97%, 98%, 99%, 100%, or any range having any two of these values as endpoints. The reflective coating 140 comprises a thickness in a range of from 50 nm to 250 nm, such as 50 nm, 75 nm, 100 nm, 125 nm, 150 nm, 175 nm, 200 nm, 225 nm, 250 nm, or any range having any two of these values as endpoints.

In the embodiment of FIG. 3A, the pipe body 130 comprises a transparent material, such as a glass material, such that the light 104 can pass through the pipe body 130 and reflect off of the reflective coating 140 with minimal loss (e.g., minimal absorption loss). One example glass material that may form the pipe body 130 of FIG. 3A is a chalcogenide glass. Chalcogenide glass is transparent in the infrared wavelength range and may be useful in embodiments in which the directed light source 102 is a CO laser, which outputs light 104 in the infrared wavelength range. In the embodiment of FIG. 3B, when the reflective coating 140 is positioned along the inner surface 132 of the hollow light pipe 120, the hollow light pipe 120 may comprise an opaque material, such as a metal material, for example, aluminum or stainless steel.

Referring still to FIGS. 3A and 3B, positioning the reflective coating 140 on the outer surface 134 of the pipe body 130 may be performed using simpler coating techniques than positioning the reflective coating 140 on the inner surface 132 of the pipe body 130. In addition, positioning the reflective coating 140 along the outer surface 134 provides protection to the reflective coating 140 via the interface between the reflective coating 140 and the outer surface 134, because there is no air interface between the reflective coating 140 and the outer surface 134. In this embodiment, the inner surface 132 of the hollow light pipe 120 may be polished. Moreover, by positioning the reflective coating 140 on the outer surface 134, the optical fiber 108 can contact the inner surface 132 (e.g., due to vibration) during a draw process without damaging the reflective coating 140. Alternatively, by positioning the reflective coating 140 on the inner surface 132, the reflectively may be increased because no light is absorbed by traversal through the pipe body 130.

Referring now to FIGS. 2A-3B, a central axis 125 of the hollow light pipe 120 is illustrated. The central axis 125 is parallel the fiber pathway 111, which is radially offset from the central axis 125, where radial offset refers to the distance between the central axis 125 and the centerline of fiber pathway 111. For example, the fiber pathway 111 may be radially offset from the central axis 125 of the pipe body 130 by a distance ($D_{off}$) in a range of from 5% to 95% a radius $R_p$ of the opening 131 of the first end 122 of the pipe body 130, such as a range of from 10% to 90% the radius $R_p$ of the opening 131, a range of from 20% to 80% the radius $R_p$ of the opening 131, or a range of from 35% to 65% the radius $R_p$ of the opening 131, for example, 5%, 10%, 15%, 20%, 25%, 30%, 35%, 40%, 45%, 50%, 55%, 60%, 65%, 70%, 75%, 80%, 90%, 95%, or any range having any two of these values as endpoints. While not intending to be limited by theory, waveguide theory predicts that the absorption of glass positioned in a light pipe depends on the radial position of the glass in the light pipe, as described by Liu, Anping, et al in Optics Communications 132, 511-518 (1996). While still not intending to be limited by theory, the absorption of light by the glass is weakest when the glass is positioned in the center of the light pipe.

As shown in FIG. 2B, the light 104 enters the first end 122 of the hollow light pipe 120 at an input angle $\Phi$ in a range of from 10° to 70° with respect to the fiber pathway 111 and the central axis 125, such as a range of from 20° to 70°, 30° to 70°, for example, 10°, 15°, 20°, 25°, 30°, 35°, 40°, 45°, 50°, 55°, 60°, 65°, 70°, or any range having any two of these values as endpoints. The input angle $\Phi$ may be controlled by the second steering mirror 152. In operation, the light 104 that enters the first end 122 of the hollow light pipe 120 is collimated and polarized, for example, linearly polarized. The input angle $\Phi$ (and polarization) should be such that the Fresnel reflection losses are minimized to allow for maximum light remaining after each reflection in the pipe. The beam size of the light 104 is such that, at minimum, the $1/e^2$ diameter of the light 104 enters the opening 131 of the pipe body 130. In some embodiments, the light 104 entering the first end 122 of the hollow light pipe 120 comprises a $1/e^2$ diameter at the opening 131 that is less than or equal to the radius $R_p$ of the opening 131 of the first end 122 of the pipe body 130, or a $1/e^2$ diameter that is less than or equal to 150% of the radius $R_p$ of the opening 131 of the first end 122 of the pipe body 130, or a $1/e^2$ diameter that is less than or equal to 175% of the radius $R_p$ of the opening 131 of the first end 122 of the pipe body 130, or a $1/e^2$ diameter that is less than or equal to 190% of the radius $R_p$ of the opening 131 of the first end 122 of the pipe body 130, or a $1/e^2$ diameter that is in a range from 150% of the radius $R_p$ of the opening 131 of the first end 122 of the pipe body 130 to 200% of the radius $R_p$ of the opening 131 of the first end 122 of the pipe body 130, or in a range from 175% of the radius $R_p$ of the opening 131 of the pipe body 130 to 200% of the radius $R_p$ of opening 131 of the first end 122 of the pipe body 130. Increasing the beam size of the light entering the first end 122 of the hollow light pipe 120 may minimize the likelihood of ablating the optical fiber 108.

Referring still to FIGS. 2A-3B, in operation, the optical fiber 108 is drawn along the fiber pathway 111 in the draw direction 107 through the pipe body 130 and the light 104 is directed into the first end 122 of the pipe body 130. As the light 104 propagates through the pipe body 130, the light 104 repeatedly reflects off the reflective coating 140. The optical fiber 108 absorbs the light 104 whenever the light 104 is incident on the optical fiber 108, leading to a transfer of energy from light 104 to the optical fiber 108. As the light 104 is repeatedly reflected when propagating through the hollow light pipe 120, the light 104 homogenizes and the optical fiber 108 receives circumferentially uniform illumination. As used herein, "homogenized light" is defined as light having a uniform energy density along the cross sectional area of the light. The light 104 becomes increasingly homogenized along the length of the hollow light pipe 120. Indeed, in some embodiments, the light 104 propagating in the hollow light pipe reaches 95% homogenization within 200 mm of the entering the hollow light pipe 120, for example, entering the first end 122 of the hollow light pipe 120. However, it should be understood that 95% homogenization may be reached within distances of less than 200 mm, for example, by increasing the input angle Φ of the light 104.

In the embodiments depicted in FIGS. 2A-3B, by directing light 104 into the first end 122, the light 104 is propagating through the hollow light pipe 120 in a direction opposite the draw direction 107. As the light 104 becomes increasingly homogenized along the length of the hollow light pipe 120, the optical fiber 108 is impinged by homogenized light shortly upon entry into the hollow light pipe 120. However, it should be understood that the light 104 may be directed into the hollow light pipe 120 such that the light propagates in the draw direction 107. In addition to reflecting the light 104, the hollow light pipe 120 captures any heat loss due to radiation from the optical fiber 108 and the reflective coating 140 reflects it back onto the optical fiber 108 for reabsorption. Indeed, the blackbody radiation of the optical fiber 108 may be reflected by the reflective coating 140 and redirected back to the optical fiber 108. Furthermore, when the light 104 comprises an infrared wavelength, the hollow light pipe 120 may be filled with a dry gas (e.g. nitrogen gas, inert gas) to prevent excessive absorption of the light 104 by water vapor present in the atmosphere. The dry gas is selected such that it does not absorb the light 104.

Figure 4:
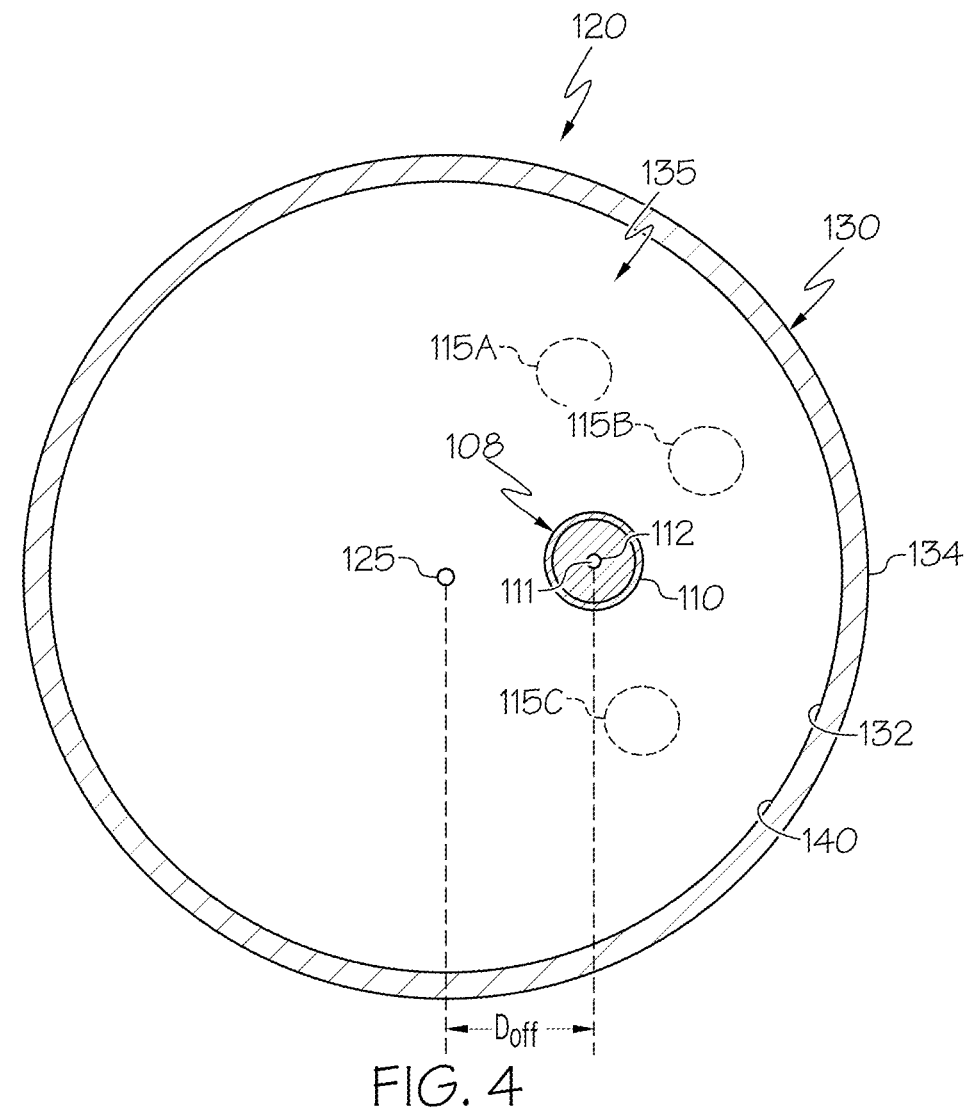
FIG. 4 schematically depicts a cross sectional view of the hollow light pipe of FIG. 2A taken along line A-A, according to one or more embodiments shown and described herein.

Referring now to FIG. 4, a cross sectional view of the hollow light pipe 120 taken along line A-A of FIG. 2A is depicted. The cross section of FIG. 4 depicts the effects of vibration on the position of the optical fiber 108 in the hollow light pipe 120. When the hollow light pipe 120 is implemented in an optical draw tower (FIG. 9), the optical fiber 108 vibrates, moving the optical fiber radially 108 during operation, for example, radial distances of up to about 1 mm. The radial distance of this offset may increase when the draw speed increases because the vibration of the optical fiber 108 increases with draw speed. Thus, to account for vibration, the diameter of the hollow light pipe 120 (defined as twice the radius $R_p$) is larger than the diameter of the optical fiber 108. For example, the diameter of the hollow light pipe 120 may be 4 to 20 times larger than the diameter of the optical fiber 108. Indeed, the diameter of hollow light pipe 120 may be such that vibrational motion of the optical fiber 108 within the hollow light pipe 120 may occur without contacting the inner surface 132 of the pipe body 130 or the surface of a reflective coating 140 disposed on the inner surface 132 of the pipe body 130. In FIG. 4, the optical fiber 108 is depicted along the fiber pathway 111 and additional locations 115A, 115B, and 115C show locations that the optical fiber 108 may reach due temporary radial offset caused by vibration. Moreover, the use of the hollow light pipe 120 mitigates the difficulty of focusing light on a vibrating optical fiber because the repeated reflection of the light 104 off the reflective coating 140 homogenizes the light 104 in the hollow light pipe 120, facilitating uniform absorption of light 104 by the optical fiber 108 at any radial position within the opening 131 of the first end 122 of the pipe body 130, resulting in even thermal and stress profiles in the optical fiber 108. In the embodiments of FIGS. 2A-4, the hollow light pipe 120 is depicted having a circular cross-sectional shape. However, it should be understood that light pipes having other cross-sectional shapes are contemplated, such as rectangular shapes, triangular shapes, polygonal shapes, rounded shapes, and elliptical shapes. However, when compared to rectangular cross-sectional hollow light pipes, circular cross-sectional hollow light pipes facilitate light absorption by the optical fiber 108 over a longer distance (e.g., length) within the hollow light pipe.

Figure 5:
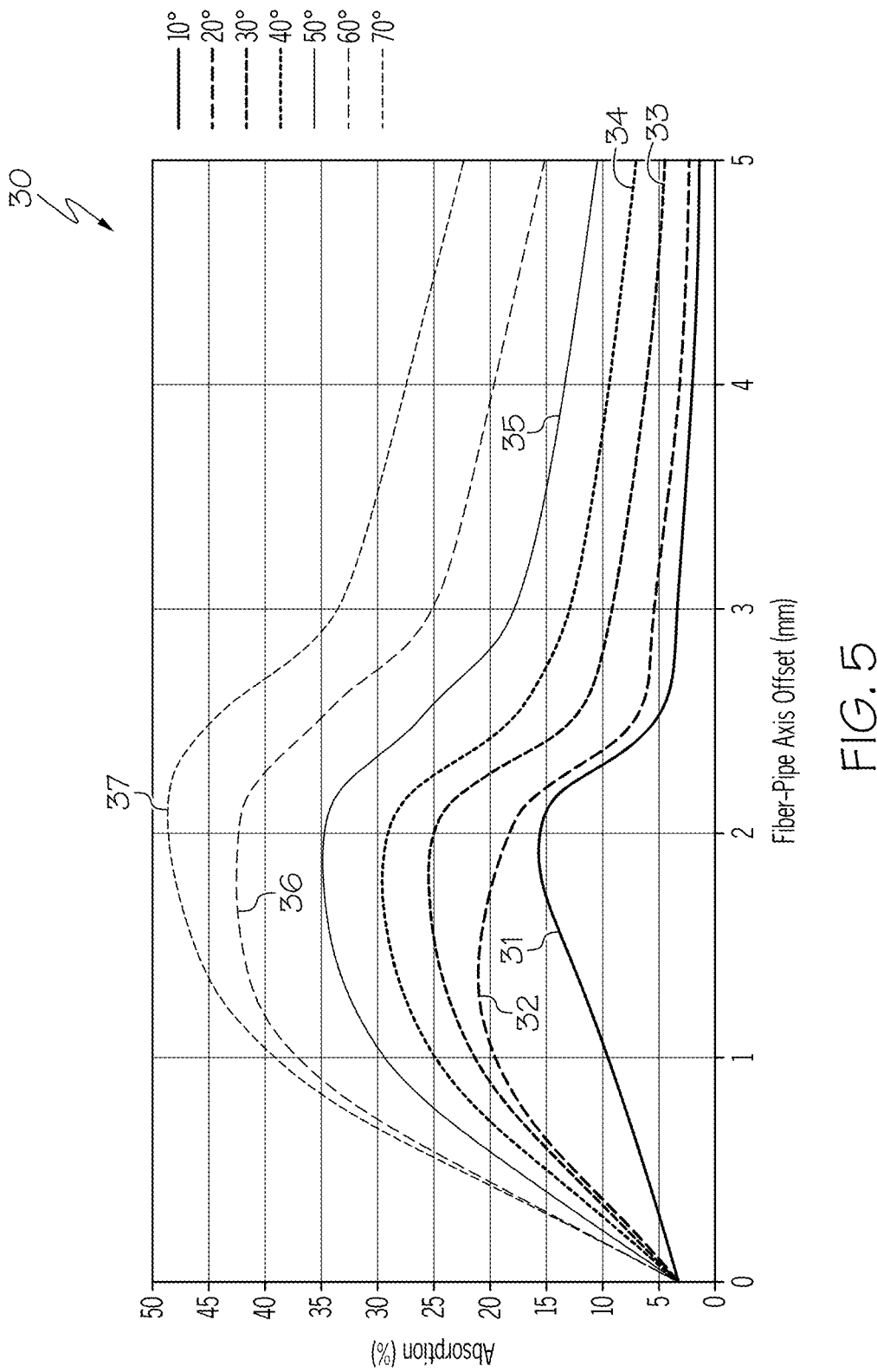
FIG. 5 graphically depicts absorption percentage of an optical fiber traversing a hollow light pipe as a function of the offset distance between a central axis of the hollow light pipe and a fiber pathway for a light entering the hollow light pipe at a number of different input angles, according to one or more embodiments shown and described herein.

Referring now to FIG. 5, a graph 30 depicts absorption percentage of the optical fiber 108 (particularly a 125 μm diameter Corning® SMF-28® Ultra Optical Fiber) traversing the hollow light pipe 120 as a function of the radial offset distance between the central axis 125 of the hollow light pipe 120 and the centerline of the fiber pathway 111 for a light 104 entering the hollow light pipe 120 at a number of different input angles Φ. The data of graph 30 was generated using light 104 output from a directed light source 102 comprising a 10.6 μm $CO_2$ laser, a hollow light pipe 120 with a length of 200 mm and a radius $R_p$ of 5 mm, and a reflective coating 140 with a reflectivity of 99% at the wavelength of the light 104 that is disposed on the inner surface 132 of the hollow light pipe 120. The absorption percentage is the percentage of the incident power of the light 104 absorbed by the optical fiber along the length of the hollow light pipe 120. The light 104 enters the hollow light pipe 120 with a $1/e^2$ beam diameter of 5 mm. In graph 30, line 31 depicts absorption percentage for an input angle Φ of 10°, line 32 depicts absorption percentage for an input angle Φ of 20°, line 33 depicts absorption percentage for an input angle Φ of 30°, line 34 depicts absorption percentage for an input angle Φ of 40°, line 35 depicts absorption percentage for an input angle Φ of 50°, line 36 depicts absorption percentage for an input angle Φ of 60°, and line 37 depicts absorption percentage for an input angle Φ of 70°. As shown in FIG. 5, the absorption percentage of the optical fiber 108 peaks when the fiber pathway 111 is offset by 2 mm from the central axis 125 of the hollow light pipe 120. As the hollow light pipe used to generate the data of the graph 30 has a 5 mm radius, this 2 mm offset is 40% of the radius $R_p$ of the opening 131. Moreover, FIG. 5 shows that the optical fiber absorbs light at any position within the opening 131 of the first end 122 of the pipe body 130, showing that a vibrating optical fiber can still absorb light at any position in the hollow light pipe 120.

Figure 6:
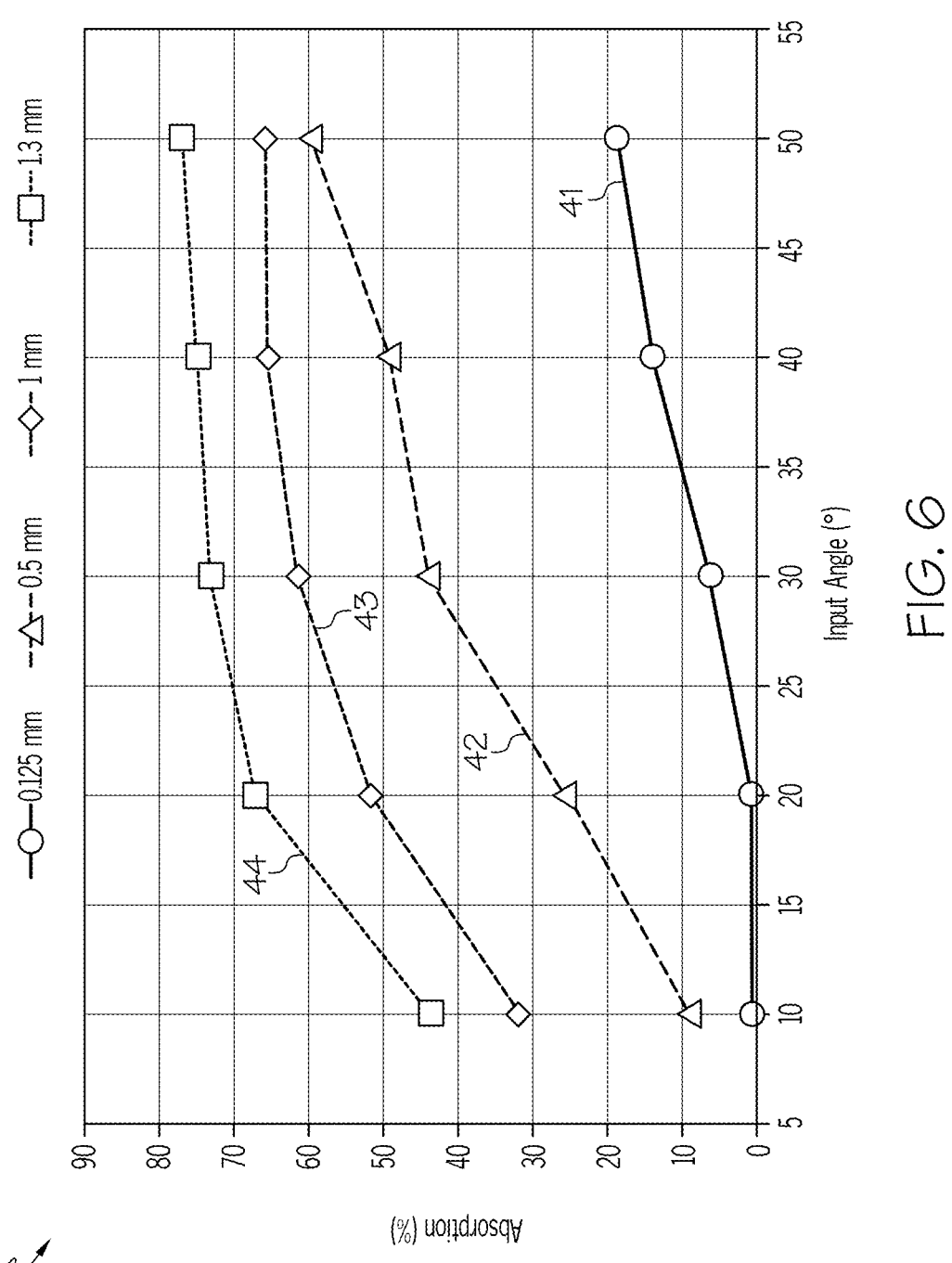
FIG. 6 graphically depicts absorption percentage of example optical fibers having different diameters that are traversing the hollow light pipe as a function of an input angle of light entering the hollow light pipe, according to or more embodiments shown and described herein.

Referring now to FIG. 6, a graph 40 depicts absorption percentage of example optical fibers having different diameters that are traversing the hollow light pipe 120 as a function of the input angle Φ of the light 104 entering the hollow light pipe 120. The data of graph 40 was generated using light 104 output from a directed light source 102 comprising a $CO_2$ laser, a hollow light pipe 120 with a length of 200 mm and a radius of 5 mm, and a reflective coating 140 with a reflectivity of 99%. The light 104 enters the hollow light pipe 120 with a $1/e^2$ beam diameter of 5 mm and the optical fibers are radially offset from the central axis 125 of the hollow light pipe 120 by a distance of 1.5 mm. In graph 40, line 41 depicts absorption percentage for an optical fiber comprising a diameter of 0.125 mm, line 42 depicts absorption percentage for an optical fiber comprising a diameter of 0.5 mm, line 3 depicts absorption percentage for an optical fiber comprising a diameter of 1 mm, and line 44 depicts absorption percentage for an optical fiber comprising a diameter of 1.3 mm. Graph 40 shows that absorption percentage increases as the diameter of the optical fiber increases. Indeed, line 44 shows that an optical fiber comprising a diameter of 1.3 mm absorbs almost 80% of the light 104 that enters the hollow light pipe 120 at an input angle Φ of 50°.

Figure 7:
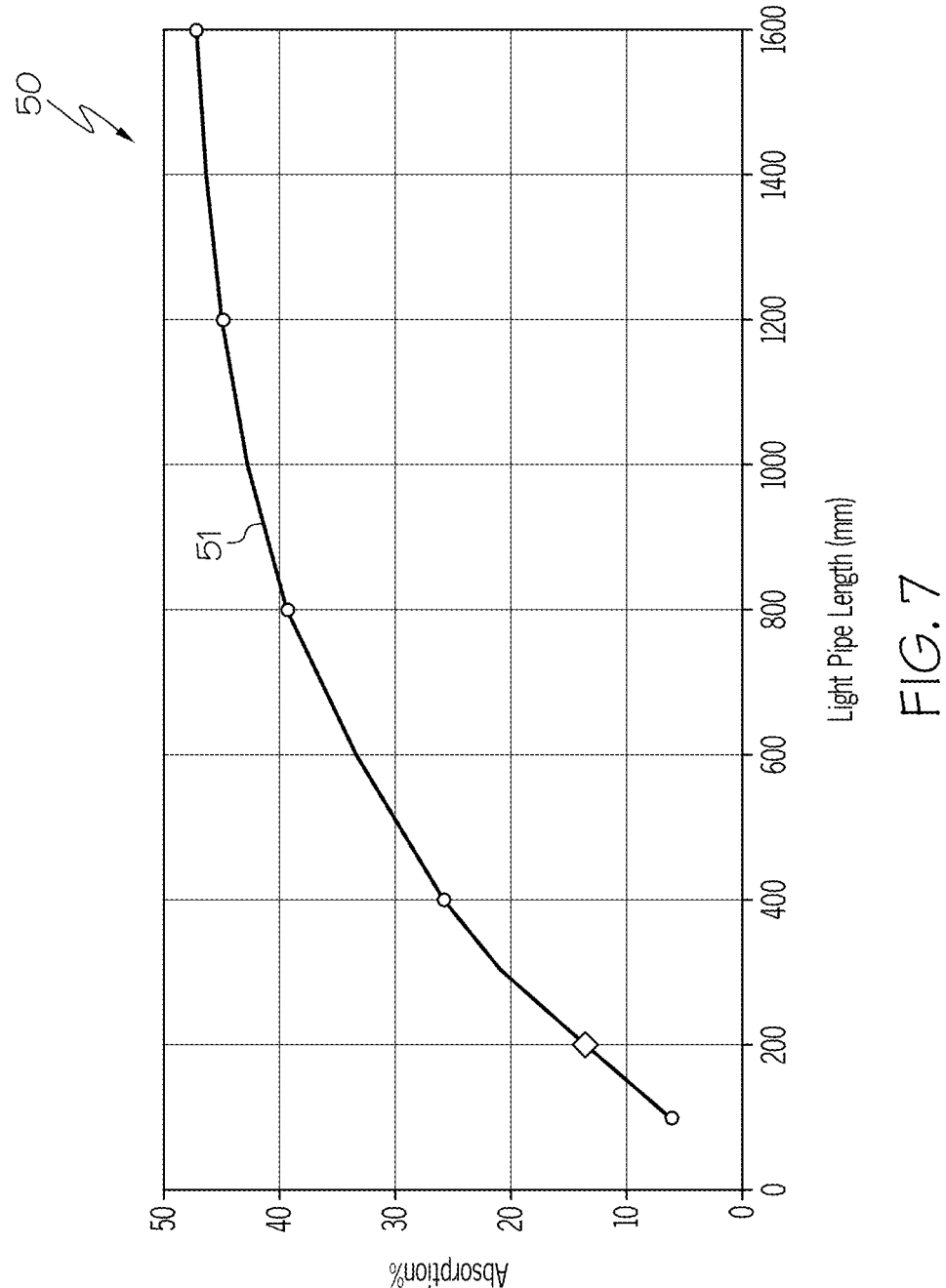
FIG. 7 graphically depicts absorption percentage of an optical fiber traversing a hollow light pipe as a function of the length of the hollow light pipe, according to one or more embodiments shown and described herein.

Referring now to FIG. 7, a graph 50 depicts absorption percentage of the optical fiber 108 traversing the hollow light pipe 120 as a function of the length of the hollow light pipe 120. The data of graph 50 was generated using light 104 output from a directed light source 102 comprising a $CO_2$ laser, a hollow light pipe 120 with a length of 200 mm, and a reflective coating 140 with a reflectivity of 99%. The light 104 enters the hollow light pipe 120 with a $1/e^2$ beam diameter of 5 mm at an input angle Φ of 50° and the optical fiber is radially offset from the central axis 125 of the hollow light pipe 120 by a distance of 4 mm. As shown by line 51, increasing the length of the hollow light pipe 120 increases the absorption percentage. The absorption increases linearly with increases to the hollow light pipe length up to 500 mm and increases asymptotically with increases to the hollow light pipe length greater than 500 mm. As shown by line 51, when the length of the hollow light pipe 120 reaches 1600 mm, the absorption approaches 50%. Moreover, increasing the reflectivity of the reflective coating 140 facilitates the use of longer hollow light pipes 120 as increasing the reflectivity reduces the attenuation of the light reflecting off the reflective coating 140.

Figure 8:
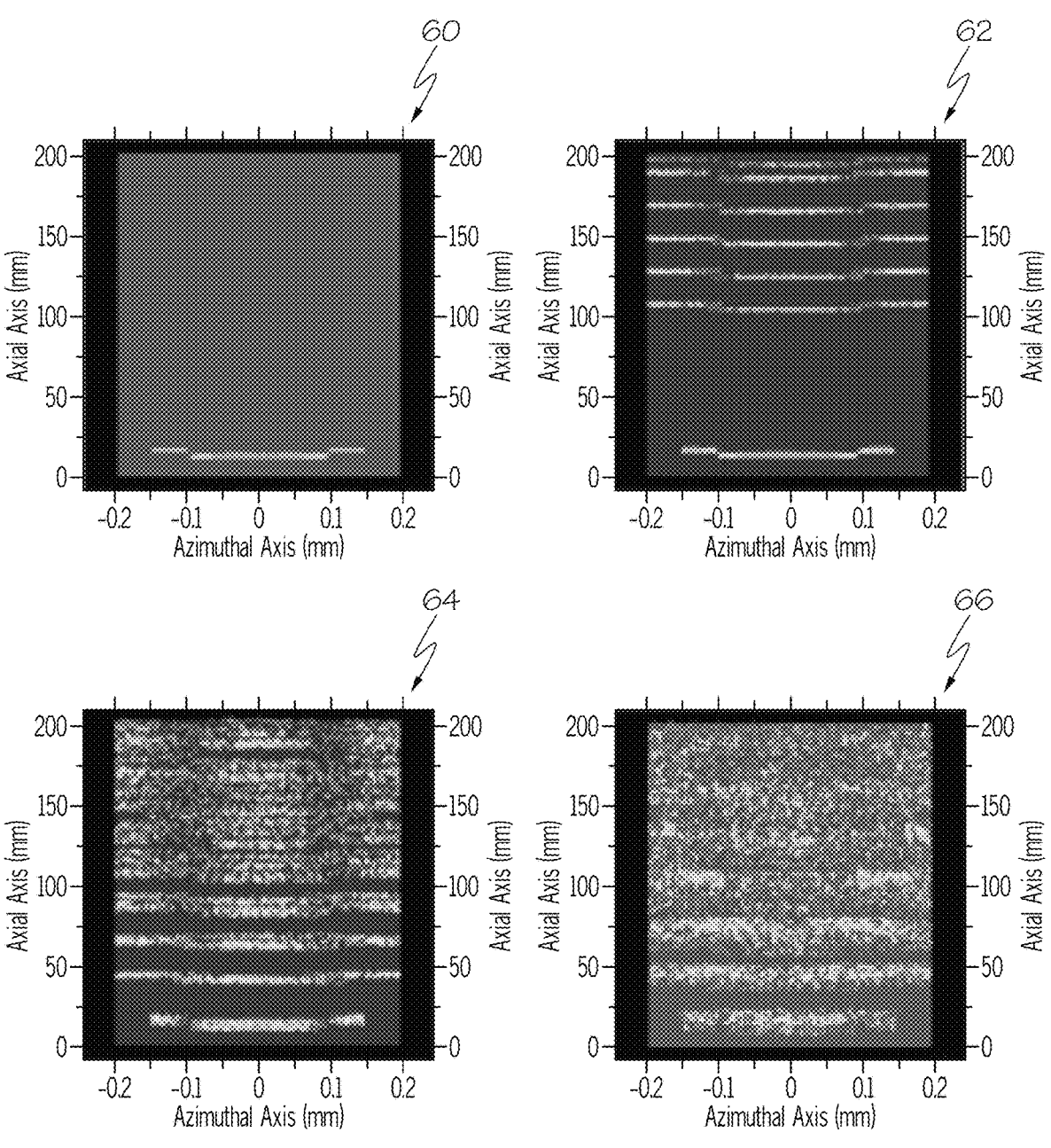
FIG. 8 graphically depicts absorption of light with different $1/e^2$ diameters by an optical fiber traversing a hollow light pipe, according to one or more embodiments shown and described herein.

Referring now to FIG. 8, graphs 60, 62, 64, and 66 depict the influence of the $1/e^2$ beam diameter of the light 104 entering the hollow light pipe 120 on absorption of light 104 by an optical fiber having a diameter of 0.125 mm that is radially offset from the central axis 125 of the hollow light pipe 120 by a distance of 4 mm. The data of graphs 60-66 was generated using light 104 output from a directed light source 102 comprising a $CO_2$ laser, a hollow light pipe 120 with a length of 200 mm and a diameter of 12 mm, and a reflective coating 140 with a reflectivity of 99%. The light 104 enters the hollow light pipe 120 with a $1/e^2$ beam diameter of 5 mm at an input angle Φ of 50°. In each of graphs 60-66, the axial axis (i.e., the Y-axis) is the location along the length of the hollow light pipe 120 where 0 mm corresponds to the first end 122 of the hollow light pipe 120 (i.e., the laser input end), 200 mm corresponds to the second end 124 of the hollow light pipe 120 (i.e., the laser output end), and the azimuthal axis (i.e., the X-axis) is the circumferential location on the optical fiber 108 (defined as πd, where d is position along the circumference relative to the initial point of incidence of light 104 on the circumference of the optical fiber 108, where d half the fiber diameter (0.0625 mm), d>0 refers to a clockwise direction around the circumference, and d<0 refers to a counterclockwise direction around the circumference).

Graph 60 depicts the absorption of light 104 comprising a $1/e^2$ beam diameter of 1 mm at the opening 131 by the 0.125 mm optical fiber 108 traversing the hollow light pipe 120. Graph 62 depicts the absorption of light 104 comprising a $1/e^2$ beam diameter of 2 mm at the opening 131 by the 0.125 mm optical fiber 108 traversing the hollow light pipe 120. Graph 64 depicts the absorption of light 104 comprising a $1/e^2$ beam diameter at the opening 131 of 5 mm by the 0.125 mm optical fiber 108 traversing the hollow light pipe 120. Graph 66 depicts the absorption of light 104 comprising a $1/e^2$ beam diameter at the opening 131 of 10 mm by the 0.125 mm optical fiber 108 traversing the hollow light pipe 120. Graphs 60-66 of FIG. 8 show that absorption increases as the $1/e^2$ beam diameter of the light 104 increases. Indeed, in graph 60 the absorption percentage is 9.4%, in graph 62 the absorption percentage is 10.1%, in graph 64 the absorption percentage is 13.5%, and in graph 66 the absorption percentage is 18.3%. FIG. 8 also shows that the uniformity of the light-fiber interaction improves as the $1/e^2$ beam diameter increases. Moreover, if the $1/e^2$ beam diameter is too small (1 mm as shown in graph 60, for example), the light 104 interacts with the optical fiber 108 at a limited location, asymmetrically heating the optical fiber 108, which may result in stress in the optical fiber core 112. By contrast, the number of interactions between the optical fiber 108 and the light 104 should be maximized to achieve a uniform illumination.

Figure 9:
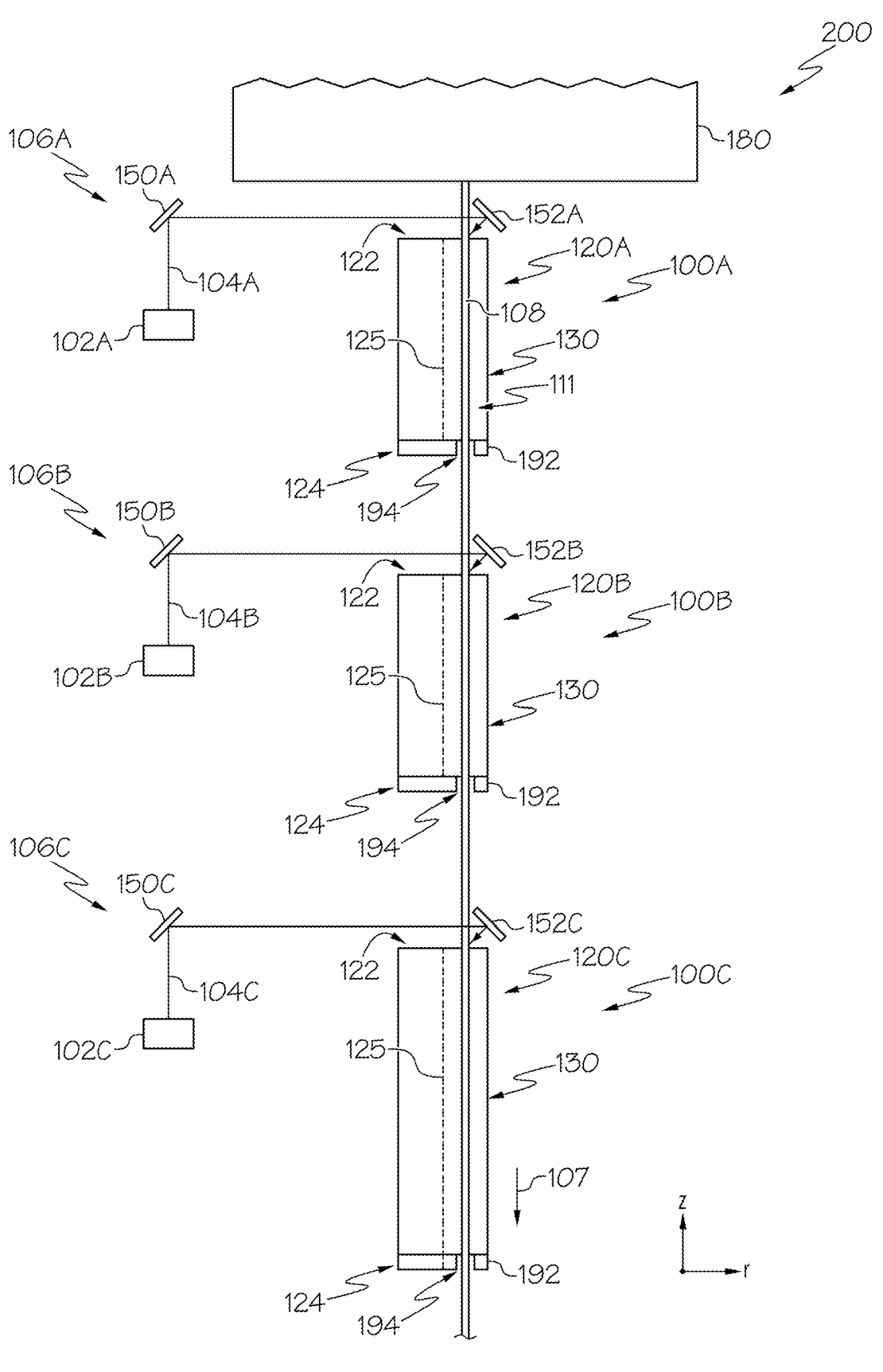
FIG. 9 schematically depicts an optical draw tower having multiple light-based optical fiber heaters, according to one or more embodiments shown and described herein.

Referring now to FIG. 9, a draw tower 200 is schematically depicted that includes a furnace 180 and multiple light-based optical fiber heat application systems including a first light-based optical fiber heat application system 100A, a second light-based optical fiber heat application system 100B, and a third light-based optical fiber heat application system 100C. In operation, the optical fiber 108 may be formed from a preform positioned in the furnace 180 by drawing the preform through and out of the furnace 180. In the embodiment depicted, the temperature of the optical fiber 108 in each of the light-based optical fiber heat application systems 100A, 100B, 100C is greater than the glass transition temperature of the core 112 of the optical fiber 108 and the light-based optical fiber heat application systems 100A, 100B 100C operate to slow the cooling of the optical fiber 108 after the optical fiber 108 exits the furnace 180 (relative to cooling the optical fiber 108 directly in air after it exits the furnace 180), thus reducing the fictive temperature of the optical fiber 108 (relative to directly cooling the optical fiber 108 in air). Each light-based optical fiber heat application system 100A, 100B 100C comprises a hollow light pipe 120A, 120B, 120C, a directed light source 102A, 102B, 102C, and an optical system 106A, 106B, 106C for optically coupling respective directed light sources 102A, 102B, 102C with respective hollow light pipes 120A, 120B, 120C. For example, each optical system 106A, 106B, 106C comprises a first steering mirror 150A, 150B, 150C and a second steering mirror 152A, 152B, 152C. Any of the hollow light pipes 120A, 120B, 120C may comprise any of the embodiments of hollow light pipes described herein. For example, each hollow light pipe 120A, 120B, 120C comprises a first end 122, a second end 124, a pipe body 130 comprising an opening 131 extending from the first end 122 to the second end 124. In addition, a reflective coating 140 (FIGS. 2A-4) is disposed on the pipe body 130 of each hollow light pipe 120A, 120B, 120C and the fiber pathway 111 extends through each hollow light pipe 120A, 120B, 120C. The length, radius $R_p$, materials of construction, placement of reflective coating 140 etc. of the hollow light pipes 120A, 120B, 120C may be the same or different.

As shown in the embodiment of FIG. 9, the first directed light source 102A is optically coupled to the first end 122 of the first hollow light pipe 120A, the second directed light source 102B is optically coupled to the first end 122 of the second hollow light pipe 120B, the third directed light source 102C is optically coupled to the first end 122 of the third hollow light pipe 120C. In operation, each of the first, second, and third optical systems 106A, 106B, 106C direct light 104A, 104B, 104C into the first end 122 of the respective hollow light pipes 120A, 120B, 120C at an input angle Φ in a range of from 10° to 70° with respect to the fiber pathway 111. While the directed light sources 102A, 102B, 102C are optically coupled to the first end 122 of the hollow light pipes 120A, 120B, 120C it should be understood that the directed light sources 102A, 102B, 102C may alternatively be optically coupled to the second end 124. The input angle Φ of the hollow light pipes 120A, 120B, 120C may be the same or different.

In some embodiments, as shown in FIG. 9, light-based optical fiber heaters 100A, 100B 100C may include one or more end mirrors 192. Each end mirror 192 may be positioned in the first end 122 or the second end 124 of a hollow light pipe 120A, 120B, 120C and includes a reflective surface facing into the hollow light pipe 120A, 120B, 120C. For example, the reflective surface of each end mirror 192 may comprise a coating of reflective material such as Au, Ag, or AgI. The end mirrors 192 may be flat, convex, or concave. Each end mirror 192 also includes a fiber opening 194. The fiber opening 194 of each end mirror 192 positioned such that the fiber pathway 111 (and therefore the optical fiber 108) passes through the fiber opening 194 without contacting the end mirror 192. In operation, the end mirrors 192 reflect unabsorbed light back into the hollow light pipe 120 for absorption by the optical fiber 108, increasing the efficiency of applying heat to the optical fiber 108. In addition, the end mirrors 192 reduce the amount of stray light exiting the hollow light pipe 120.

By using multiple light-based optical fiber heaters 100A, 100B, 100C, each hollow light pipe 120A, 120B, 120C may be shorter and/or may have reflective coatings 140 with a lower reflectivity of the light 104. This provides design flexibility as each light-based optical fiber heat application system 100A, 100B, 100C provides a modular slow cooling device. Indeed, hollow light pipes of various sizes may be used in combination with a variety of directed light sources to optimize the reheating desired at each stage along the draw tower 200. Moreover, if long length hollow light pipes are required to achieve the desired application of heat, this functionality may be achieved with multiple, smaller length hollow light pipes each optically coupled to a directed light source, as shown in FIG. 9.

In other embodiments, the temperature of the core 112 of the optical fiber 108 when it enters a light-based optical fiber heat application system, or the first of a series of light-based optical fiber heat application systems, is at or below the glass transition temperature of the core 112 of the optical fiber 108. In such embodiments, the temperature of the core 112 of the optical fiber 108 is greater than or equal to room temperature and less than or equal to the glass transition temperature and the optical light-based optical fiber heat application system, or combination of two or more light-based optical fiber heat application systems, reheats to core 112 of the optical fiber 108 to a temperature above the glass transition temperature of the core 112 of the optical fiber 108.

In still other embodiments, the draw tower 200 includes an additional furnace downstream of the furnace 180. The additional furnace provides a further mechanism for controlling the cooling rate of the optical fiber 108; e.g. by establishing an environment for the optical fiber with a temperature above room temperature and below the temperature of the core 112 of the optical fiber 108 (e.g. through conventional heating elements as opposed to a directed light source). Examples of the additional furnace include annealing furnaces and slow cooling devices known in the art. In embodiments, the additional furnace is configured to control the rate of cooling of the optical fiber to less than 5000° C./s, or less than 4000° C./s, or less than 3000° C./s, or in a range from 1000° C./s to 5000° C./s, or in a range from 1500° C./s to 4000° C./s. The scope of the present disclosure extends to combinations of the light-based optical fiber heat application system 100 with such additional furnaces, where one or more of the light-based optical fiber heat application systems 100 may be placed along the fiber pathway between the additional furnace and the furnace 180 or the additional furnace may be placed along the fiber pathway between furnace 180 and the one or more light-based optical fiber heat application systems.

In further embodiments, the draw tower 200 includes a coating unit to apply a coating composition to the optical fiber, where the coating composition is a viscous liquid composition that forms a protective coating on the optical fiber when cured. The coating composition is a curable formulation that forms a rigid polymer when cured. Common viscous liquid compositions include one or more acrylate monomers. In embodiments including a coating unit, the coating is applied after the optical fiber has passed through one or more light-based optical fiber heating systems of the type disclosed herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of processing an optical fiber, the method comprising:

drawing an optical fiber along a fiber pathway through a hollow light pipe, wherein:

the hollow light pipe comprises a first end having an opening with a radius $R_p$, a second end and a pipe body comprising a chamber extending from the first end to the second end, the fiber pathway extending through the pipe; and a reflective coating is disposed on the pipe body; and directing a light from a directed light source into the hollow light pipe through the opening of the first end such that the light is reflected by the reflective coating while propagating in the hollow light pipe, the optical fiber absorbing the light reflected by the reflective coating, wherein the light enters the opening of the first end of the hollow light pipe at an input angle in a range of from 10° to 70° with respect to the fiber pathway with a $1/e^2$ diameter that is less than or equal to the radius $R_p$ of the opening of the first end, and wherein the light is polarized and enters the opening of the first end of the hollow light pipe such that Fresnel reflection losses are minimized.

2. The method of claim 1, wherein a temperature of a core of the optical fiber at the opening of the first end is less than a glass transition temperature of the core of the optical fiber.

3. The method of claim 2, wherein when the optical fiber absorbs the light, the temperature of the core of the optical fiber increases to greater than the glass transition temperature.

4. The method of claim 1, wherein the fiber pathway is laterally offset from a central axis of the pipe body by a distance in a range of from 20% to 80% of the radius $R_p$.

5. The method of claim 1, wherein the directed light source is optically coupled to a steering mirror positioned to direct the light into the opening of the first end of the hollow light pipe at the input angle.

6. The method of claim 1, wherein the input angle is in a range of from 30° to 70° with respect to the fiber pathway.

7. The method of claim 1, wherein the reflective coating is disposed on an inner surface of the pipe body.

8. The method of claim 1, wherein the reflective coating is disposed on an outside surface of the pipe body.

9. The method of claim 1, wherein the reflective coating has a reflectivity of 95% or greater of the light.

10. The method of claim 1, wherein a number of reflections of the light by the reflective coating is two or more while the light propagates in the hollow light pipe, the optical fiber absorbing the light after each of the reflections.

11. A method of processing an optical fiber, the method comprising:

drawing an optical fiber along a fiber pathway through a hollow light pipe, wherein:

the hollow light pipe comprises a first end having an opening with a radius $R_p$, a second end and a pipe body comprising a chamber extending from the first end to the second end, the fiber pathway extending through the opening of the first end, wherein the fiber pathway is laterally offset from a central axis of the pipe body by a distance in a range of from 20% to 80% a radius $R_p$ of the opening of the first end; and a reflective coating is disposed on the pipe body, the reflective coating comprising a reflectivity of 95% or greater of a light; and directing the light from a directed light source into the hollow light pipe through the opening of the first end such that the light is reflected by the reflective coating while propagating in the hollow light pipe, the optical fiber absorbing the light reflected by the reflective coating, wherein the light enters the opening of the first end of the hollow light pipe at an input angle in a range of from 10° to 70° with respect to the fiber pathway with a $1/e^2$ diameter that is less than or equal to the radius $R_p$ of the opening of the first end, and wherein the light is polarized and enters the opening of the first end of the hollow light pipe such that Fresnel reflection losses are minimized.

12. The method of claim 11, wherein the hollow light pipe comprises a length of 200 mm or greater.

13. A system for processing an optical fiber, the system comprising:

an optical draw tower comprising a fiber pathway, wherein the optical draw tower is configured to draw an optical fiber along the fiber pathway;

a first hollow light pipe and a second hollow light pipe positioned along the optical draw tower, each hollow light pipe comprising a first end having an opening with a radius $R_p$, a second end, and a pipe body comprising a chamber extending from the first end to the second end, wherein a reflective coating is disposed on the pipe body of each hollow light pipe and the fiber pathway extends through each hollow light pipe from the first end to the second end;

a first directed light source optically coupled to the first end of the first hollow light pipe, wherein light output by the first directed light source comprises first polarized light, the first polarized light entering the opening of the first end of the first hollow light pipe such that Fresnel reflection losses are minimized; and a second directed light source optically coupled to the first end of the second hollow light pipe, wherein light output by the second directed light source comprises second polarized light, the second polarized light entering the opening of the first end of the second hollow light pipe such that Fresnel reflection losses are minimized.

14. The system of claim 13, further comprising:

a first optical system configured to direct light output by the first directed light source into the first hollow light pipe through the opening of the first end at an input angle in a range of from 10° to 70° with respect to the fiber pathway; and a second optical system configured to direct light output by the second directed light source into the second hollow light pipe through the opening of the first end at an input angle in a range of from 10° to 70° with respect to the fiber pathway.

15. The system of claim 14, wherein the first optical system and the second optical system each comprise a first steering mirror and a second steering mirror.

16. The system of claim 13, further comprising one or more end mirrors each comprising a fiber opening, wherein each of the one or more end mirrors is positioned in the first end or the second end of the first hollow light pipe or the second hollow light pipe, wherein the fiber pathway extends through the fiber opening of each end mirror.

17. The system of claim 13, wherein the fiber pathway is laterally offset from a central axis of the pipe body of each of the first hollow light pipe and the second hollow light pipe by a distance in a range of from 20% to 80% the radius $R_p$ of the opening of the first end of each of the first hollow light pipe and the second hollow light pipe.

18. The system of claim 13, wherein the reflective coating disposed on the pipe body of each hollow light pipe has a reflectivity of 95% or greater of the light.

* * * * *